United States Patent [19]

Foye

[11] Patent Number: 4,487,028
[45] Date of Patent: Dec. 11, 1984

[54] CONTROL FOR A VARIABLE CAPACITY TEMPERATURE CONDITIONING SYSTEM

[75] Inventor: David M. Foye, La Crosse, Wis.

[73] Assignee: The Trane Company, La Crosse, Wis.

[21] Appl. No.: 534,849

[22] Filed: Sep. 22, 1983

[51] Int. Cl.³ .............................................. F25B 7/00
[52] U.S. Cl. ...................................... 62/115; 62/175; 62/208; 165/22
[58] Field of Search ................... 165/22; 62/175, 510, 62/228.5, 228.4, 208, 201, 115; 236/1 EA

[56] References Cited

U.S. PATENT DOCUMENTS

| | | | |
|---|---|---|---|
| 3,204,423 | 9/1965 | Resh, Jr. | 236/75 X |
| 4,152,902 | 5/1979 | Lush | 236/1 EA |
| 4,210,957 | 7/1980 | Spethmann | 62/175 X |
| 4,439,997 | 4/1984 | Cantley | 62/175 |

*Primary Examiner*—William E. Wayner
*Attorney, Agent, or Firm*—Ronald M. Anderson; Carl M. Lewis

[57] ABSTRACT

A control for a variable capacity reciprocating compressor water chiller system. A microprocessor connected to monitor return and supply fluid temperature sensors in the system is programmed to vary the compressor capacity in response to the deviation of the return and supply chilled water temperatures from desired values. The control determines these desired values as a function of predetermined full load return, supply, and reference temperature setpoints, and as a function of the relative loading of the chiller system. The control also functions to selectively offset the chilled water temperatures in one of three control modes. If zone temperature sensors are connected to the control, the offset is a function of the deviation of the weighted average zone temperature from a setpoint. The second control mode allows offset as a function of the outdoor ambient air temperature, and the third, as a function of a temporary setpoint.

26 Claims, 7 Drawing Figures

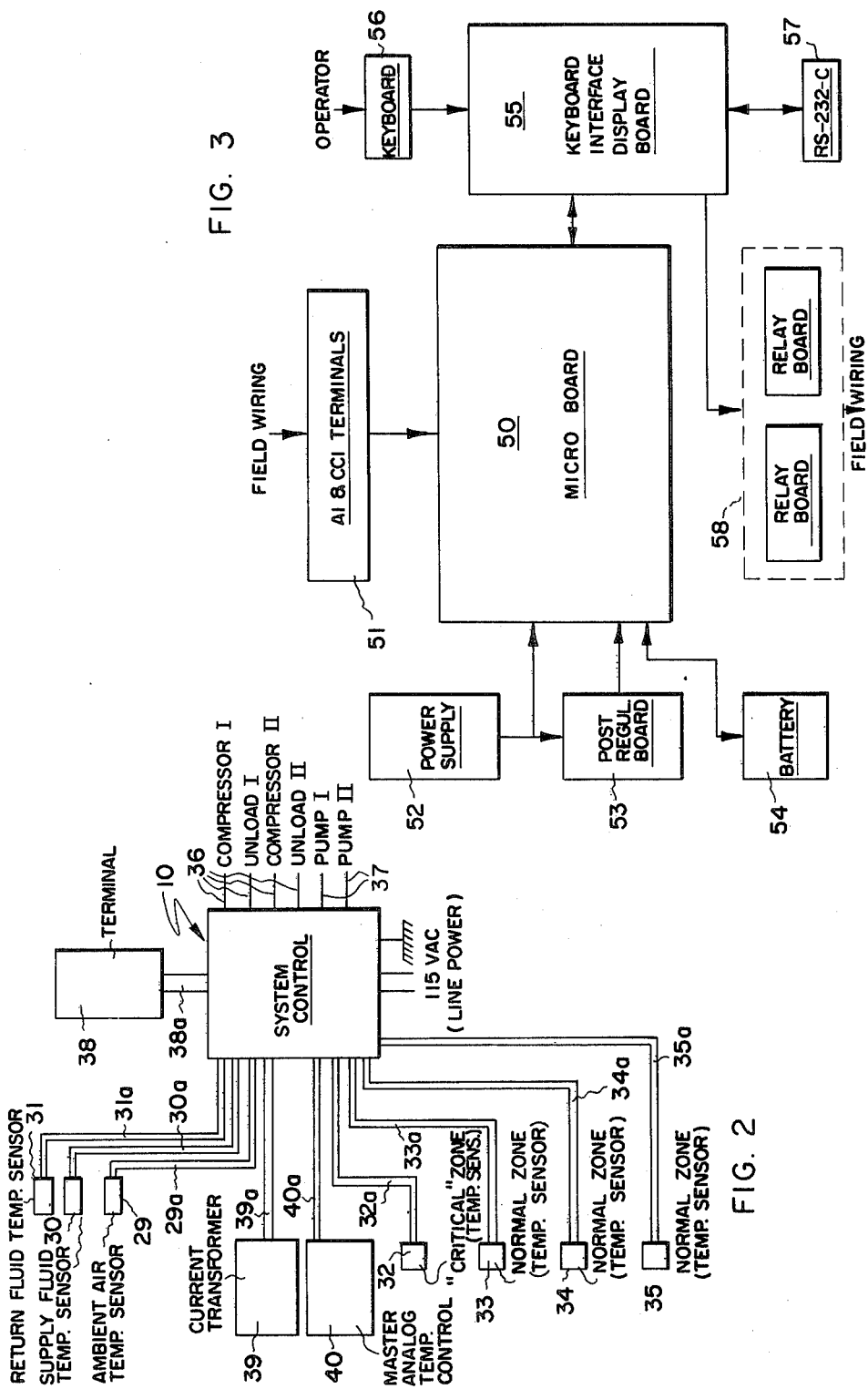

CONTROL FOR A VARIABLE CAPACITY TEMPERATURE CONDITIONING SYSTEM

DESCRIPTION

1. Technical Field

This invention generally pertains to a control for a variable capacity temperature conditioning system and specifically to a control that is operative to vary the system capacity as a function of operating parameters such as temperature.

2. Background Art

A common method for heating or cooling a building involves the circulation of a temperature conditioned liquid through a heat exchanger disposed in each comfort zone of the building. A fan controlled by a zone thermostat forces air through the heat exchangers associated with that zone, to modify its temperature. The liquid (normally a water/ethylene glycol solution) is chilled in the evaporator of a refrigerant system by heat transfer with a vaporizing refrigerant fluid. The refrigerant vapor is compressed, condensed, and returned to the evaporator to repeat the cycle. Cooling systems designed on this principle are usually referred to as "chilled liquid systems".

To operate efficiently, the chiller system capacity must be varied as the temperature conditioning load changes. The load on the system (temperature conditioning demand) is normally determined by the deviation of the supply chilled liquid temperature from a predetermined setpoint. As fewer zones in the building require cooling, both the return and the supply chilled liquid temperature begin to decrease, causing the chiller control to reduce the system capacity. Such a control may also include a reset function for modifying the control response to supply liquid temperature deviation as a function of the return liquid temperature or outdoor ambient air temperature. Conventional chiller controls are generally simple in design and limited in capability.

More complex control functions can be implemented in controls based on a microprocessor, an example of which is disclosed in U.S. Pat. No. 4,152,902. The invention described in this patent is designed to control one or more centrifugal compressors, and includes "soft start", load limiting, lead/lag compressor cycling, and detection and indication of compressor failures.

Prior art chiller controls of conventional designs use fixed setpoints and fixed time delay devices (thermostatic devices) that typically cause greater cooling capacity to be used for cool down on initial system start-up than is necessary. This results in unstable chilled liquid temperature control, overshoot of the desired temperature setpoint, and excessive peak electrical power demand. Further, a fixed setpoint thermostatic device can only respond to temperature changes at its operating point, causing unnecessary cycling with reduced equipment service life. Even microprocessor based controls such as that shown in the '902 patent fail to achieve optimum capacity control. The incremental time changes in the capacity of the control are not fully responsive to system parameters over a wide range of load. In addition, none of the prior art chiller controls have integrated the proper control response of the system to the return liquid temperature *as a function of load*.

It is therefore an object of this invention to control a variable capacity temperature conditioning system in which a fluid is circulated through the system to condition a comfort zone, in an energy-efficient, stable manner.

A further object of this invention is to vary the temperature of the temperature conditioned supply fluid as a function of load on the system.

A still further object of the invention is to control the system capacity as a function of the relative loading of the temperature conditioning system, and of three full load temperature setpoints.

Yet a still further object is to modify the capacity control as a function of other parameters, including outdoor ambient air temperature, a temporary setpoint provided by the user, or the deviation of the weighted average of zone temperatures from a setpoint.

These and other objects of the invention will be apparent from the following description of the preferred embodiment and by reference to the attached drawings.

DISCLOSURE OF THE INVENTION

In accordance with the present invention, a control for a variable capacity temperature conditioning system is disclosed, in which a fluid is circulated through the system to temperature condition a comfort zone. The control includes a supply and a return fluid temperature sensor and control means responsive to the two sensors. The supply fluid temperature sensor is disposed to sense the temperature of the fluid supplied by the system to condition the comfort zone, and the return fluid sensor is disposed to sense the temperature of the fluid after it has been used for this purpose. The control means are operative to vary the capacity of the temperature conditioning system in response to the deviation of the return and the supply fluid temperatures from desired values determined by the control means as a function of the relative loading of the temperature conditioning system and as a function of three predetermined full load setpoints. These setpoints are the return, supply, and reference full load fluid temperature setpoints.

BRIEF DESCRIPTION OF THE DRAWINGS

FIG. 2 is a block diagram illustrating the manner in which the subject control interfaces to the temperature conditioning system.

FIG. 3 is a block diagram of the subject control.

DISCLOSURE OF THE PREFERRED EMBODIMENT

Figure 1:
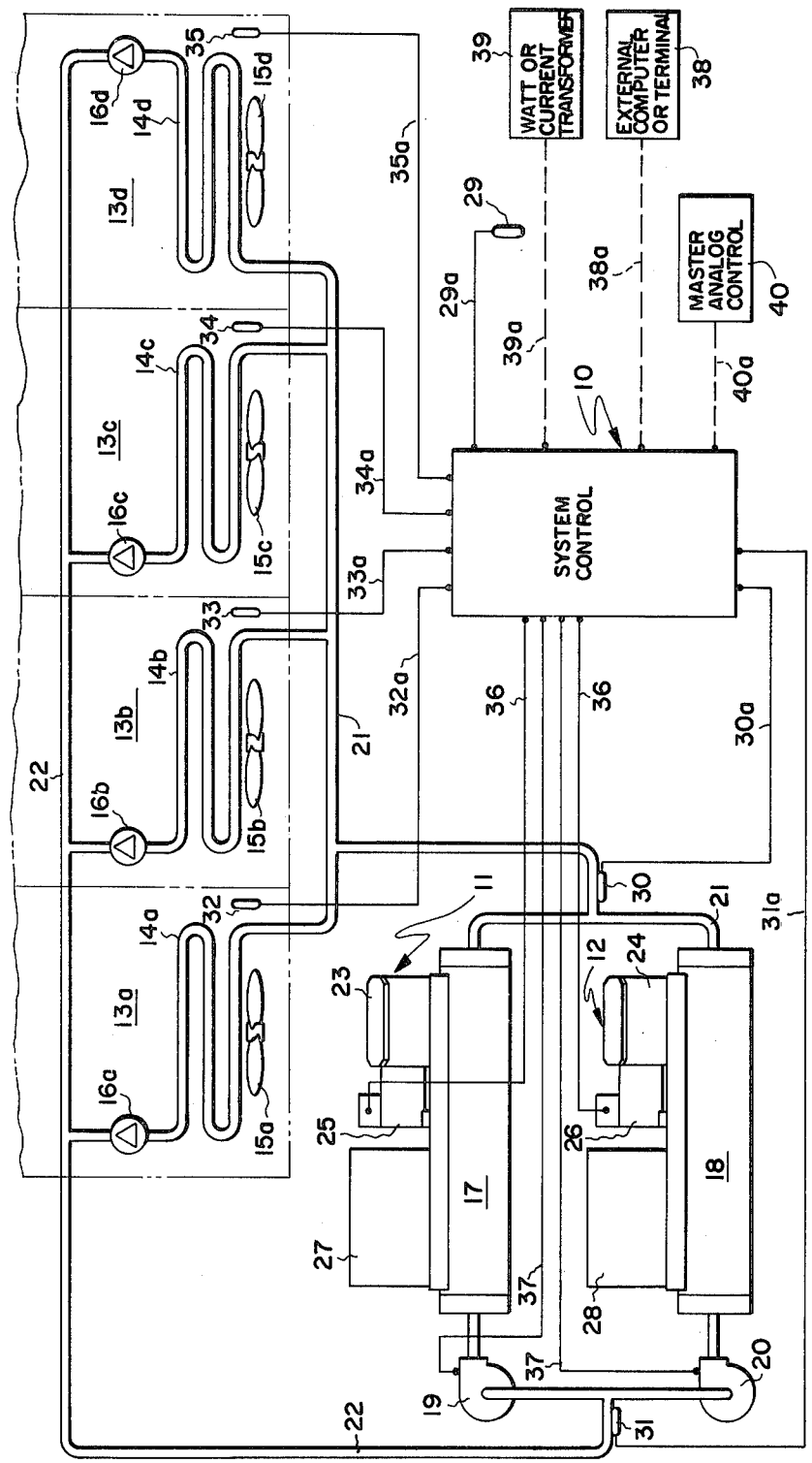
FIG. 1 is a block diagram of a liquid chiller temperature conditioning system controlled by the subject invention.

Referring to FIG. 1, a liquid chiller system is shown having a system control, generally denoted by reference numeral 10. The liquid chiller includes a first refrigeration system 11, and a second refrigeration system 12 connected in parallel to provide chilled water for cooling comfort zones 13a, b, c, and d. Chilled water provided by the first and second refrigeration systems 11 and 12 is supplied to comfort zones 13 and circulated through heat exchangers 14a, b, c, and d, disposed in each zone. Fans 15a, b, c, and d are used to circulate air through the heat exchangers 14 to cool the zones. The flow of chilled liquid through the zone heat exchangers 14 is controlled by thermostatic valves 16a, b, c, and d so that the temperature in each comfort zone may be set at a point independent of the temperature in the other zones 13. The thermostat on valves 16 is responsive to the zone temperature and in addition, controls fans 15, so that each fan operates only when there is a cooling demand in its zone.

First and second refrigeration systems 11 and 12 include respectively, first and second refrigerant evaporators 17 and 18 through which the liquid is circulated to chill it by heat exchange with the vaporizing refrigerant; evaporators 17 and 18 are therefore referred to as "liquid chillers". First and second pumps 19 and 20 are also included in the system for circulating the fluid through evaporators 17 and 18, and through the zone heat exchangers 14 via chilled fluid supply line 21. After passing through heat exchangers 14, the fluid returns to the inlet of pumps 19 and 20 by means of return fluid lines 22.

Refrigeration systems 11 and 12 are generally conventional and further include first and second reciprocating compressors 23 and 24 driven by first and second compressor motors 25 and 26. Water circulated through a cooling tower (not shown) is used to cool the compressed refrigerant as it flows in first and second condensers 27 and 28. In the preferred embodiment, first and second compressors 23 and 24 each include two stages to provide four levels of variable capacity in the chiller system. It will be apparent that when first compressor 23 is energized, first pump 19 should also be energized. The same is true for second compressor 24 and second pump 20. The second stages in compressors 23 and 24 may be unloaded using one of several well known techniques, such as suction gas cut-off. Alternatively, first and second motors 25 and 26 may be of the variable speed type to modulate the capacity of the system.

Refrigerant fluid compressed by first and second compressors 23 and 24 and condensed in first and second condensers 27 and 28, passes through an expansion device (not shown), and is vaporized by heat transfer with the liquid that is circulated through first and second evaporators 17 and 18 by means of first and second pumps 19 and 20. The vaporized refrigerant then returns to the compressor suction inlet to repeat the refrigeration cycle. It will be apparent that either the first refrigeration system 11 or the second refrigeration system 12 may be operated independently of the other with either one or two stages unloaded.

An ambient temperature sensor 29 is disposed to sense the temperature of the outdoor ambient air and is connected to the system control 10 by means of leads 29a. System control 10 also receives temperature inputs from a supply fluid temperature sensor 30 that is disposed on the supply fluid line 21, and is connected to the system control 10 by means of leads 30a. Likewise, a return fluid temperature sensor 31 is connected to the control 10 by means of leads 31a. Sensor 31 is disposed on the return fluid line 22. Each of zones 13 may optionally include a zone temperature sensor 32, 33, 34, and 35 connected to the system control 10 by means of leads 32a, 33a, 34a, and 35a. In some situations it is desirable to control the capacity of the system as a function of the deviation of the average zone temperature from a setpoint. Temperature control in some zones may be more critical than in others. For purposes of illustration, if zone 13a is considered the critical zone, then deviation from the desired setpoint may be mathematically weighted more strongly for that zone in calculating the average temperature so that it has a greater impact on the operation of the system than each of zones 13b, 13c, and 13d. This will be further explained hereinbelow.

To control the first and second refrigeration systems 11 and 12, system control 10 operates electrical contactors (not shown) placed in series with the electrical line power supply to each power consuming component of the system. Contactor control is effected by means of leads 36 connecting system control 10 with first and second motors 23 and 24 and by leads 37, connecting the control 10 to first and second pumps 19 and 20. Contactor controls leads 36 are also operative to effect unloading of the stages in compressors 23 and 24.

As an option, system control 10 may be made responsive to demand limiting requirements on the electrical power consumption of the temperature conditioning system. For this purpose, control 10 may be connected to a watt or current transducer 39 by means of leads 39a. Transducer 39 is connected to monitor the total power consumed by the system.

In some circumstances, it may also be desirable for an external computer or terminal 38 to communicate with the system control 10. Data may be exchanged bidirectionally between control 10 and the external computer 38 over leads 38a.

There is also provision for controlling the system control 10 using an analog DC voltage signal (master analog voltage level) from a user supplied source 40 connected to control 10 by means of lead 40a. The master analog voltage level may range between 0-10 volts, with different control functions being provided as the voltage level changes. This signal may be used to override the "normal" control functions and responses of control 10.

The relationship of the various inputs and control lines used with system control 10 is more clearly shown in FIG. 2. Leads 36 and 37 are specifically used to energize the first and second compressors 23 and 24 and to unload one stage of each of the compressors as required to vary system capacity. As noted above, first and second pumps 19 and 20 must be controlled in conjunction with the operation of first and second compressors 23 and 24.

Figure 4:
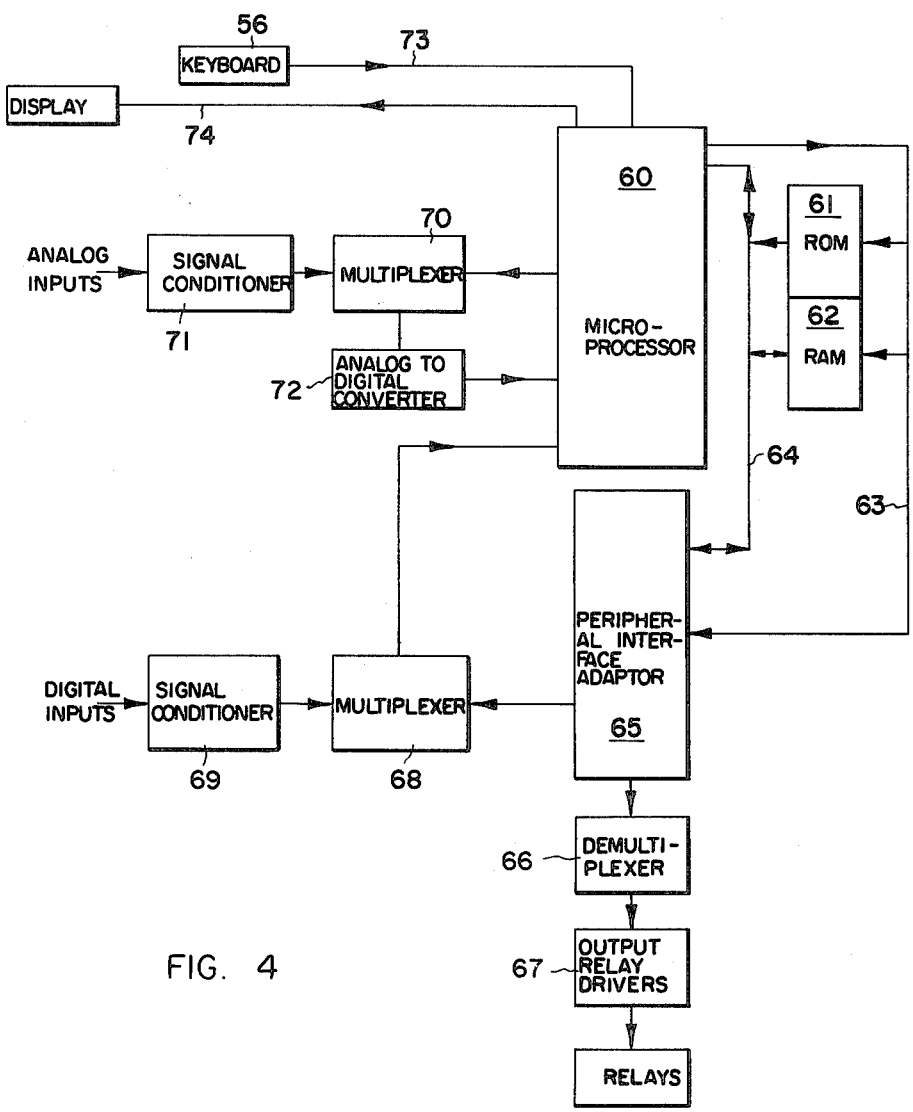
FIG. 4 is a block diagram of the microprocessor control board incorporated in the subject invention.

Referring now to FIG. 3, a block diagram shows the various functional components of the system control 10. A key element of the system control 10 is a microprocessor board 50 that comprises a plurality of electronic circuits as shown in FIG. 4. Connected to microprocessor board 50 are terminations for each of the leads comprising the analog inputs (AI) and the auxiliary switches on the contactors (CCI) used to effect control of the first and second motors 25 and 26, and pumps 19 and 20. These terminals are incorporated on a board 51. A power supply 52 provides DC voltage at the proper levels to the components on microcomputer board 50, with additional regulation provided by postregulator board 53. A battery 54 supplies backup power in the event of line power failure.

A keyboard interface/display board 55 is used to input contact closures from a keyboard 56 and to communicate bidirectionally through a RS-232 interface 57. The RS-232 interface allows serial communication with an external computer or terminal 38 as noted above. Board 55 also provides an output to a relay board 58 to effect control of the first and second motors 25 and 26, and first and second pumps 19 and 20. Board 55 also includes a ditigal display and indicator lights.

In FIG. 4, the microprocessor 60 used to control the refrigeration systems 11 and 12 in response to various inputs is shown connected to the circuits by which it interfaces with the various inputs and by means of which it provides controlling output signals. In the preferred embodiment, microprocessor 60 comprises a Motorola Corporation Model 6803 microprocessor that internally includes 128 bytes of random access memory (RAM). Random access memory is used for storing temporary values and for storing data input by the operator. In addition, microprocessor 60 operates according to a set of instructions stored in a read only memory (ROM) 61 to which it is connected by both address lines and data lines. The preferred embodiment uses 8K bytes of ROM to effect all the functions of the system control 10. An additional 256 bytes of RAM 62 are also addressed by microprocessor 60 as an extension of the internal RAM. The address lines 63 provides a means for the microprocessor 60 to select the particular storage location for data that is to be transferred into or out of the microprocessor 60 over data lines 64.

Also connected to address and data lines 63 and 64 is a peripheral interface adaptor 65. In the preferred embodiment, this is a Motorola type 6821 integrated circuit. The peripheral interface adaptor 65 permits microprocessor 60 to interface an output signal to a particular device and to select a particular input as a source of incoming data. For example, the peripheral interface adaptor 65 connects microprocessor 60 to a demultiplexor 66 so that the processor may select a desired relay for change of state. The output of demultiplexor 66 is connected to the relay driver 67 to transform a logic level signal into a signal with sufficient power to drive the relays.

The peripheral interface adaptor 65 also interfaces to multiplexor 68 for selecting a digital source as input to the microprocessor 60. In this application, digital inputs are generally contact closures. Each input comprises a logic level voltage that passes through a signal conditioner 69 to a port on the microprocessor 60. The signal conditioner 69 comprises passive filters that remove unwanted noise.

Microprocessor 60 directly controls a multiplexor 70 to select incoming analog inputs that pass through a signal conditioner 71. The analog inputs are applied through terminal board 51 as noted above, and once selected by multiplexor 70 are converted to a digital signal by analog-to-digital converter 72. This is necessary, since microprocessor 60 is a digital device and does not directly respond to the relative magnitude of an analog signal. Serial communications from keyboard 56 enter microprocessor 60 through a serial communication line 73. Data to be displayed to the operator is transferred to a digital display over another serial communication line 74.

Figure 5:
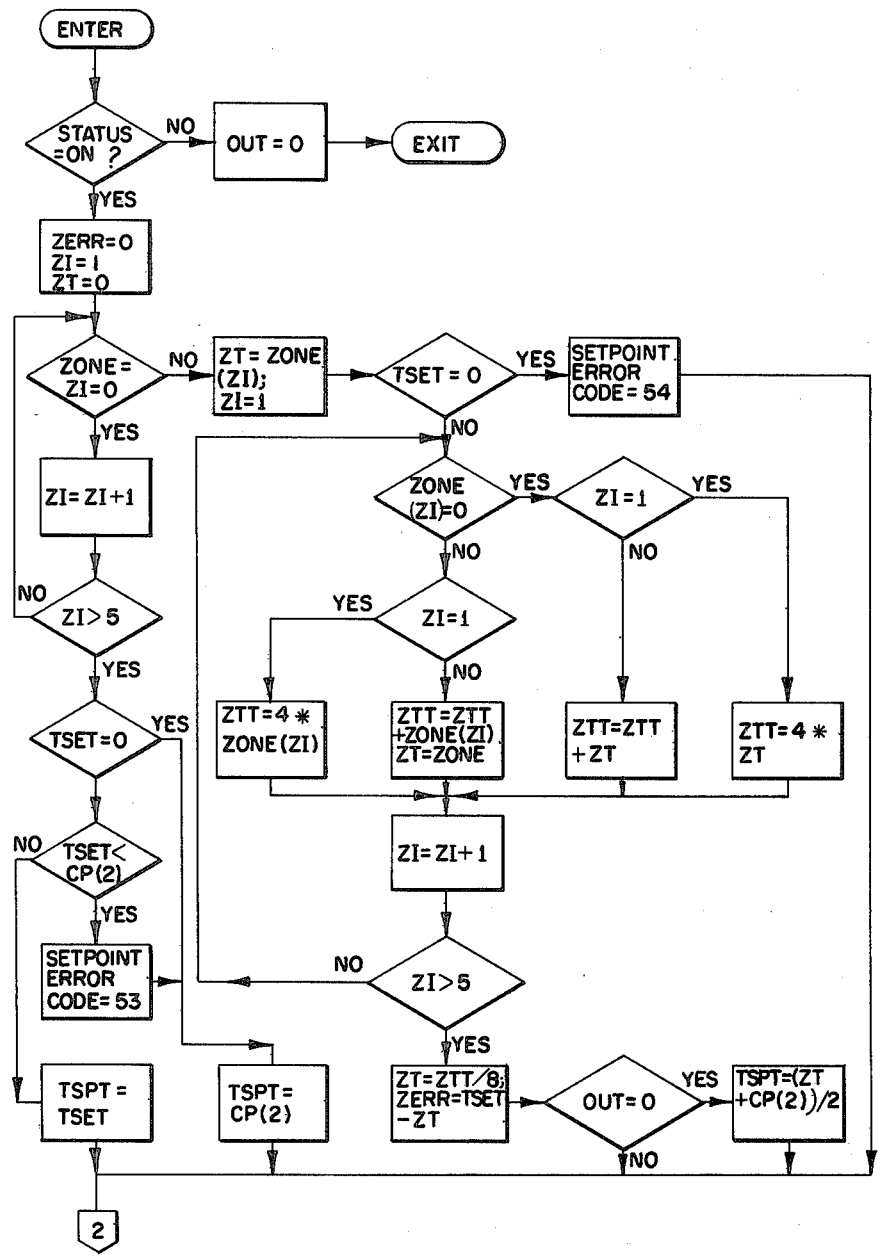
FIGS. 5–7 are flow charts showing the control logic used by the microprocessor incorporated in the subject invention.
Figure 6:
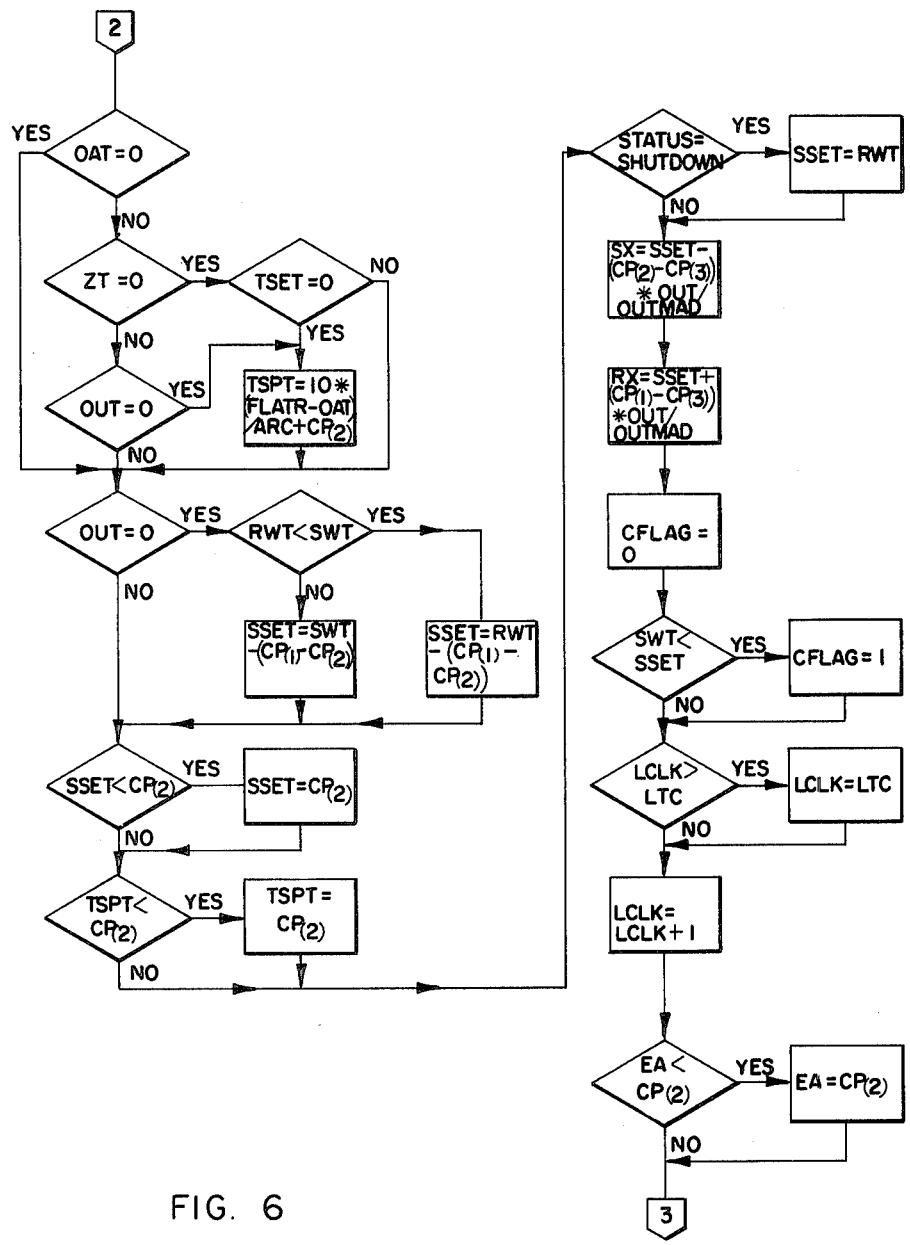
Figure 7:
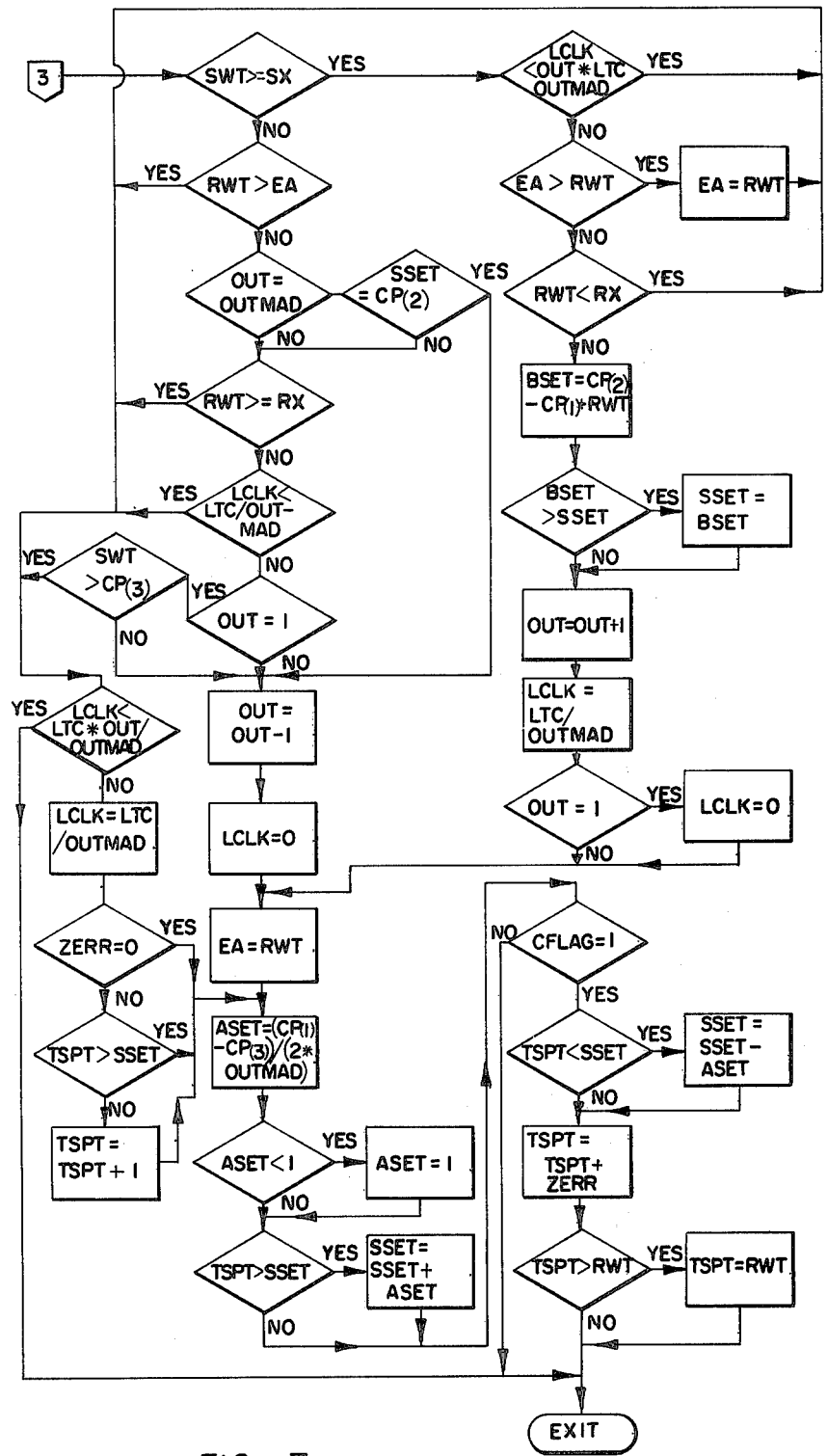

FIGS. 5-7 illustrate the control logic incorporated in the instructions stored in read only memory 61 for carrying out the control functions of system control 10. Numerous other control functions besides those involving the subject invention are effected by the program stored in ROM 61; however, only the logic disclosed hereinbelow and in the flow charts of FIGS. 5-7 is necessary for an enabling disclosure of the invention as claimed.

The flow charts in FIGS. 5-7 use a variety of terms which are at times somewhat confusing. To assist in understanding the control logic, these terms are defined in the following table:

TABLE I

DEFINITION OF TERMS

ZERR: The summed and average zone sensor temperature error.
ZI: The zone reference number.
ZT: The zone temperature (scratch pad value).
TSET: An operator input temperature setpoint provided on a temporary (daily) basis for offset control of the fluid temperatures, either zone temperature or chilled fluid setpoint.
SX: The active control setpoint for supply fluid temperature.
RX: The active control setpoint for return fluid temperature.
SSET: The calculated value currently used to compute SX and RX.
TSPT: A calculated target value which SSET is attempting to equal.
LCLK: The loop counter clock; each loop through the program requires about 5 seconds.
LTC: An operator input time constant, range 0-21 minutes, is internally multiplied by 12 so that it may be used as a reference for comparison against LCLK. The product is LTC.
FLATR: An operator input full load ambient temperature reference setpoint; an ambient temperature below which fluid temperature reset is applied.
ARC: An operator input value for ambient reset coefficient; the ratio by which chilled fluid setpoints are increased as a function of the outdoor ambient air temperature.
OUT: The number of compressor stages that are in operation.
OUTMAD: The number of loadable chiller stages available without starting more pumps.
CP(1): An operator input full load return fluid temperature setpoint.
CP(2): An operator input full load reference temperature setpoint.
CP(3): An operator input full load supply fluid temperature setpoint.
RWT: The measured return water temperature.
SWT: The measured supply water temperature.
EA: A value for the previously measured return water temperature.

Control 10 is applicable to a variety of temperature conditioning systems. The operator has three options in selecting a control mode for the temperature conditioning system and may greatly affect the operation of the system by his choice of full load return, reference and supply fluid temperatures. In one mode of control, system control 10 responds to the average deviation of the zone temperatures from a predetermined setpoint, wherein some of the zone temperatures are weighted to have a greater effect on the average than others. In a second control mode, the operator may elect to use a temporary reference temperature setpoint which is likely to be changed on a frequent (daily) basis. This temporary setpoint causes a temporary change in the permanent reference setpoints for full load operation of the system that are initially established by the operator or service technician. The third mode allows control of the system as a function of outdoor ambient air temperature. These three control modes are for the most part, mutually exclusive, i.e., once the operator elects to control the system in one mode, the other modes of control are not permitted; however, if zone temperature control mode is selected, outdoor air reset mode will be used for the initial cooldown. An overview of the system operation following an explanation of the control logic, will help to explain the inter-relationship of these three control modes.

The upper right corner of FIG. 5 shows the entry point to the control logic executed by system control 10. Microprocessor 60 first determines whether cooling is operative, i.e., if either first or second motors 25 and 26 are energized. If cooling is not operative, the variable term OUT is set equal to 0 and the control routine is exited. Alternatively, when cooling is operative, three variables are initialized; specifically, ZERR is set equal to 0, ZI is set equal to 1, and ZT is set equal to 0. ZERR is thus initialized to 0 and remains equal to 0 in the event that zone control mode is inactive. ZI is the number of the zone being evaluated, ranging from 1-5, and ZT is a scratch value indicative of the zone temperature. The program logic then determines if the temperature of zone ZI is equal to 0. This condition occurs if no zone temperature sensor (32 through 35) is connected to that input, or if its associated lead is open (defective). If the operator elects not to use zone temperature as a control mode, none of the zone temperature sensors 32 through 35 would be connected. Assuming that a zone temperature sensor 32 is connected for zone 1, ZT is set equal to the temperature in zone 1 and ZI is reset to equal 1. The program logic then determines if the zone temperature setpoint is equal to 0, and if so, the display is caused to show an error code 54 to alert the operator that he has failed to establish a zone temperature setpoint even though zone temperature sensors are connected in the system.

The predetermined zone temperature setpoint TSET is entered in random accessory memory by the operator if he wishes to control by zone temperature. The control asks if the temperature of zone ZI is equal to 0; if the answer is yes, microprocessor 60 then determines if it is dealing with the first zone, and if so, sets the value ZTT equal to four times the temperature represented by ZT. Alternatively, ZTT is set equal to the prior value of ZTT plus the current value of ZT. However, in our example, since the temperature of zone 1 is not equal to 0, the logic then asks if ZI equals 1, and since it does, sets ZTT equal to four times the temperature in zone 1. When ZI does not equal 1, ZTT is set equal to ZTT plus the temperature in ZI and ZT is set equal to the temperature in zone ZI. ZI is then incremented by one, and if less than five zones have been considered, the logic loops back to a point where the control determines if the temperature in the incremented zone is equal to 0. The affect of the foregoing logic is to provide a weighting factor to the temperature sensors in selected zones 13 according to the values shown in Table II.

TABLE II

| ZONE SENSOR CONFIGURATIONS | | | | | | |
|---|---|---|---|---|---|---|
| Number of Sensors | Weighting Ratio | Zone Sensor Connections | | | | |
| | | Z1 | Z2 | Z3 | Z4 | Z5 |
| 1 | 1 | 1 | — | — | — | — |
| 2 | 1:1 | 1 | 2 | — | — | — |
| 2 | 1.6:1 | 1 | — | 2 | — | — |
| 2 | 3:1 | 1 | — | — | 2 | — |
| 2 | 7:1 | 1 | — | — | — | 2 |
| 3 | 4:1:3 | 1 | 2 | 3 | — | — |
| 3 | 2:1:1 | 1 | 2 | — | 3 | — |
| 3 | 5:2:1 | 1 | — | 2 | — | 3 |
| 3 | 6:1:1 | 1 | — | — | 2 | 3 |
| 4 | 4:1:1:2 | 1 | 2 | 3 | 4 | — |
| 4 | 5:1:1:1 | 1 | — | 2 | 3 | 4 |
| 5 | 4:1:1:1:1 | 1 | 2 | 3 | 4 | 5 |

Once all five zones have been checked, ZT is set equal to the accumulated weighted average, determined by dividing ZTT by 8, and ZERR is set equal to the deviation between the weighted average value and the predetermined setpoint TSET. The program logic then determines if cooling is energized by asking if OUT is equal to 0. OUT is the number of stages of cooling that are energized and, if equal to 0, indicates that cooling is inactive. Assuming that cooling is not operative, the variable TSPT is set equal to an average of the average zone temperature ZT and the reference full load setpoint CP(2).

Referring to the left column on FIG. 5, if the microprocessor 60 should find that the temperature in all zone ZI is equal to 0, the program logic drops through to the next inquiry to determine whether the variable TSET is equal to 0. This establishes whether the operator has elected to use a temporary temperature setpoint, input for example, on a daily basis. It should be noted that if the zone temperature control mode is used, the program logic never inquires whether a temporary setpoint has been supplied by the operator. If the operator has not supplied a temporary setpoint, TSPT is set equal to the full load reference temperature CP(2). Alternatively, if the operator has input a non-zero value for TSET, program logic then determines if TSET is less than a full load reference value CP(2) and, if yes, notes that a setpoint error has occurred by displaying the number "53". Subsequently, the variable TSPT is again set equal to the full load reference value. If TSET is equal to or greater than the full load reference value CP(2), the variable TSPT is set equal to the temporary setpoint value TSET.

Continuing on FIG. 6, microprocessor 60 next determines if the outdoor air temperature sensor 29 is connected by asking if the outdoor air temperature OAT is equal to 0. If the sensor is connected, OAT is a non-zero value and program logic would determine if ZT equals 0. ZT only equals 0 if there are no zone temperature sensors connected. Assuming that this were the case, the program logic then inquires if TSET equals 0. This establishes whether the user has supplied a temporary setpoint. Again, assuming that the operator has input a temporary setpoint equal to zero, the variable TSPT is set equal to ten times the difference between the full load ambient temperature reference and the outdoor air temperature divided by the ambient reset coefficient, plus the full load reference temperature setpoint. The full load ambient temperature reference (FLATR) is a user-supplied temperature level defining the upper limit for reset as a function of outdoor air temperature. As the outdoor ambient air temperature drops below the full load ambient temperature reference, the target setpoint TSPT increases by an amount determined by the value of the ambient reset coefficient (ARC). Reset as a function of outdoor ambient temperature can only occur if no zone temperature sensors are installed and if the operator has not established a temporary setpoint, TSET, or on initial start-up of the cooling system.

Once more, the program logic determines if the cooling system is operative, and if not, further determines if the return water temperature measured by sensor 31 is less than a supply water temperature measured by sensor 30. If the return water temperature is colder, the variable SSET is set equal to the return water temperature RWT minus the difference between the full load return water temperature setpoint CP(1) and the reference full load setpoint CP(2). However, if the return water temperature is not colder than the supply water temperature, then SSET is set equal to the supply water temperature minus the difference between the full load return water temperature setpoint and the reference temperature setpoint. Thereafter, or alternatively if cooling is operative, program logic determines if the value for SSET is less than the full load reference temperature setpoint. If so, SSET is redefined as the full load reference temperature. The next inquiry determines if TSPT is less than the full load reference setpoint, and if so, TSPT is set equal to the full load reference temperature setpoint. The last two inquiries merely establish lower limits for the variables SSET and TSPT, the lower limit being equal to the full load reference temperature setpoint.

If the control logic establishes that all cooling stages are to be shut down within time LTC, the value for SSET is redefined as equal to the return water temperature. This causes the chiller to unload anticipating shutdown, thereby saving energy. The variable SX which is the active control setpoint for supply water temperature is then set equal to the value SSET minus the difference between the reference full load temperature and the supply full load temperature times the number of stages energized, divided by the number of stages available without starting more pumps, (e.g., without energizing second pump 20 when first pump 19 only is energized). Likewise, an active control setpoint for return water temperature, RX, is set equal to SSET plus the difference between the return water full load setpoint and the reference full load setpoint times the number of stages of conditioning energized divided by the number of stages available without starting more pumps. The calculation of RX and SX as a function of the variables SSET, OUT/OUTMAD, and of the predetermined constants CP(1), CP(2), and CP(3) is the key aspect of control logic in this invention.

A control flag is then set equal to 0, and an inquiry is made to determine if the supply water temperature is less than the value of SSET. If so, the control flag is set equal to 1. The condition indicated by SWT being less than SSET implies that a control action may be required.

The operator is given the opportunity to select a value for the control time constant LTC. This time constant is indicative of the time required for a control action to impact on the chiller system. If too short, system control 10 will overshoot the desired temperature and be unstable. If too long, the system will lag in its response to load changes. A loop counter LCLK is compared against the user defined time constant LTC, and if greater than LTC, is set equal to it. The loop counter LCLK is then incremented by 1.

Microprocessor 60 then checks to see if the last-measured value for the return water temperature EA is less than the full load reference temperature CP(2). If it is, EA is redefined as being equal to the full load reference temperature CP(2). This establishes a lower limit for the value EA used in subsequent calculations.

Continuing on FIG. 7, an inquiry is made to determine if the supply water temperature SWT, is greater than or equal to the active control setpoint for supply water temperature, SX. If not, this implies that it may be necessary to unload a stage of the chiller system, because the supply water is too cold. If the supply water temperature is lower, the next inquiry determines if the return water temperature is greater than the previous-measured value for the return water temperature EA. An affirmative answer to this inquiry indicates that it probably is not necessary to unload a chiller stage. Conversely, if the number of stages loaded equals the number of stages that may be loaded without starting an additional pump, and if the value SSET is equal to the full load reference temperature, then microprocessor 60 immediately reduces the number of stages loaded by 1. If SSET does not equal the full load reference temperature, a further inquiry determines if the return water temperature is greater than or equal to the active control setpoint for the return water temperature RX. If not, the counter loop is checked to see if it is less than the user supplied time constant LTC divided by the number of stages available without energizing an additional pump. If not, and if the number of stages energized is not equal to 1, the system again de-energizes one stage. Even if one stage is energized but the supply water temperature is not greater than the full load supply temperature setpoint CP(3), the system drops 1 stage chiller capacity. Once a stage of chiller capacity is unloaded, the counter loop is set equal to 0.

An affirmative response to the preceding inquiries branches to an inquiry which checks to see if the counter loop is less than the user supplied time constant LTC multiplied by the ratio of the number of energized stages divided by the number of stages available without energizing an additional pump. If not less than this value, the loop counter is set equal to the user time constant LTC divided by the number of stages available without energizing an additional pump. Otherwise the system immediately exits the loop. Once the loop counter is reset to its new value, the system inquires if the value of ZERR is equal to 0. This is to determine if a correction is to be applied for the deviation of the weighted average zone temperatures from the setpoint. If there is no correction for zone temperature, the value for temporary setpoint is then checked to see if it is greater than SSET, and if not, it is incremented by 1. The logic path rejoins the program at a point following a control action to either add or delete a stage of temperature conditioning, as discussed hereinbelow.

Returning to the top of FIG. 7, if the supply water temperature is greater than or equal to the active control setpoint for supply water temperature SX, there is an inquiry to determine if the loop counter is less than the number of stages energized times the user supplied time constant, divided by the number of stages available without energizing an additional pump. If not, the value of EA, the last measured return water temperature, is checked to determine if it exceeds the current return water temperature. If the answer is affirmative, EA is set equal to the current return water temperature. If not, the microprocessor 60 inquires whether the return water temperature is less than the active control setpoint for return water temperature RX. If it is, this implies that no further control action is necessary at this point, and the flow of logic proceeds to join with the logic path taken if the control found it unnecessary to unload, or load. Otherwise, a further inquiry is made to determine if a function BSET is greater than the value SSET, where BSET is equal to the difference between the full load reference temperature and the full load return water temperature setpoint plus the actual measured return water temperature. If the answer to this inquiry is positive, SSET is set equal to the calculated value for BSET. If the result of the inquiry is negative, or after the reassignment for the value of SSET, an additional chiller stage is energized and the value for the loop counter LCLK is set equal to the user supplied time constant LTC divided by the number of available stages without energizing an additional pump. However, if only one stage is thereafter energized, the value for the loop counter is set equal to 0. The logic thereafter sets a new value for EA equal to the present return water temperature.

At this point in the program logic, the microprocessor 60 has determined either that a change in capacity is necessary and has taken the appropriate action, or has found such change unnecessary. It then calculates a value ASET equal to the full load return fluid temperature setpoint minus the full load supply fluid temperature setpoint divided by 2 times the number of stages that are available without energizing an additional pump. The value of ASET is thus an indication of the affect of changing capacity by one stage, in degrees of temperature. If the value of ASET is less than 1, it is set equal to 1, thus establishing a lower limit. Thereafter, an inquiry is made by microprocessor 60 to determine if the temporary setpoint is greater than SSET, and if so, SSET is assigned a value equal to its previous value plus the value ASET. Then if the control flag is equal to one, the target setpoint (TSPT) is checked to determine if it less than SSET, and if so, SSET is made equal to its previous value minus ASET. The target setpoint, TSPT, is thereafter set equal to the sum of its previous value plus ZERR, the difference between the zone setpoint value and the weighted average of the temperatures in the zone. If the target setpoint is greater than the return water temperature, it is set equal to the return water temperature, thereby establishing an upper limit for that variable. If the previous inquiry to determine whether the control flag is equal to 1 is answered in the negative, the reassignment for SSET and target setpoint is avoided and the program logic exits the loop. It will be apparent that the purpose of calculating ASET is to modify the value for SSET, by the value of ASET in a direction dependent upon the relative values of the target setpoint and the prior value of SSET.

It is helpful to consider the control provided by microprocessor 60 in a less detailed fashion to appreciate its distinct advantages over the prior art controls for chillers. As noted above, the operator has three control modes available to him, the more efficient being control based on the weighted average deviation of the zone temperatures from a setpoint. If any zone temperature sensors 32 through 35 are installed, this mode of control is automatically selected. Local zone thermostatic controls 16 must be set to lower temperatures than TSET. System control 10 varies chilled water temperature to satisfy zone conditions on a priority basis and the capacity is varied directly in response to sensed zone load.

When no zone temperature sensors are installed, the operator has the opportunity to establish a setpoint temperature TSET to regulate the chilled water temperatures for each daily schedule. The value of TSET must be equal to or greater than the full load reference setpoint and has the effect of raising the full load return fluid temperature setpoint and the full load supply fluid temperature setpoint by the amount that TSET exceeds the full load reference setpoint. As an example, assume that the full load return fluid temperature setpoint is programmed at 55° F., the full load reference setpoint at 50° F., and the full load supply fluid temperature setpoint at 45° F. If the operator inputs a value for TSET equal to 53° F., the full load return fluid temperature setpoint is offset to 58° F. and the full load supply fluid temperature setpoint is offset to 48° F., the full load reference temperature setpoint having been offset by 3° F.

A third control mode allows for reset of the target reference setpoint TSPT as a function of the outdoor ambient air temperature and an outdoor reset coefficient supplied by the user. The control algorithm continually recalculates a value for SSET the reference setpoint currently used to compute SX and RX, adjusting SSET each time microprocessor 60 cycles through the control loop, so that it equals the target setpoint TSPT. In turn, SX and RX are calculated as a function of the reference setpoint SSET so that a change in the target setpoint TSPT causes an offset in the values of SX and RX that is directionally proportional to the change in the target setpoint resulting from the reset function.

Each of the three possible modes of operation therefore tends to offset the return water and supply water temperatures from where they would normally be without the affect of the zone temperature deviation, the outdoor air temperature, or the user supplied setpoint. It is important to understand that the operator initially establishes the basic parameters for system operation by selecting a full load return fluid temperature setpoint CP(1), a reference full load temperature setpoint CP(2), and a full load supply temperature to setpoint CP(3) to meet his requirements. If the operator initially selects a full load reference setpoint which is equal to the full load return fluid temperature setpoint, the system control 10 maintains a constant return fluid temperature that does not vary with load. For example, if both the full load return fluid temperature and the full load reference setpoint are set equal to 55° F., and if the full load supply fluid temperature is set equal to 45° F., at 50% load on the system, the return water temperature should equal 55° F., and the supply water temperature should equal 50° F. Alternatively, if the reference setpoint is equal to the full load supply fluid temperature, sensor control 10 will maintain a constant supply water temperature. Thus, if the return full load fluid temperature setpoint is equal to 55° F. and if both the full load reference setpoint and full load supply fluid temperature setpoints are equal to 45° F., at 50% load, the return water temperature should equal 50° F., and the supply water temperature 45° F.

As a third example, if the full load reference setpoint is set midway between the full load supply fluid and full load return fluid setpoints, and if the full load return and full load supply fluid temperatures are 55° and 45° F. respectively, at 50% load, the return and supply fluid temperatures will be controlled to 52.5° and 47.5° F., respectively. Each of the three possible operating modes can cause a proportional shift in the return and supply fluid temperatures for each of the three examples cited above. System control 10 therefore gives the operator considerable latitude in control of a chiller system and allows him to define the important parameters over which he wishes to maintain control.

Although reciprocating compressors 23 and 24 are shown in the preferred embodiment, it will be understood that other types of compressors such as centrifugal compressors with inlet guide vane capacity modulation may also be used in conjunction with system control 10. It is also possible that instead of circulating a liquid through heat exchanger 14 in each of zones 13 as in the preferred embodiment, temperature conditioned air could also be directly circulated to the comfort zones 13 and system control 10 could be used to effect capacity control as a function of the supply and return air temperatures. Furthermore, the program logic of system control 10 may be modified for use with a heating system in a manner which will be apparent to those skilled in the art. In addition, compressors 23 and 24 may be operated in either parallel or serial configuration.

While the present invention has been described with respect to a preferred embodiment, it is to be understood that these and other modifications thereto will be apparent to those skilled in the art, which modifications lie within the scope of the present invention as defined in the claims which follow.

I claim:

1. A control for a variable capacity temperature conditioning system in which a fluid is circulated through the system to temperature condition a comfort zone, comprising
   a. a supply fluid temperature sensor for sensing the temperature of the fluid supplied by the system to condition the comfort zone;
   b. a return fluid temperature sensor for sensing the temperature of the fluid after it is used to condition the comfort zone;
   c. control means connected to the supply and the return fluid temperature sensors, said control means being operative to vary the capacity of the temperature conditioning system in response to the deviation of the return and the supply fluid temperatures from desired values determined by the control means as a function of
      i. a predetermined full load return fluid temperature setpoint;
      ii. a predetermined full load supply fluid temperature setpoint;
      iii. a predetermined full load reference fluid temperature setpoint; and
      iv. the relative loading of the temperature conditioning system.

2. The control of claim 1 wherein the control means are further operative to adjust said three full load fluid temperature setpoints by an offset at start-up, said offset successively decreasing in value as the system approaches equilibrium.

3. The control of claim 2 wherein the offset at start-up is related to the greater of the differences between
   a. the sensed return fluid temperature and the predetermined full load return fluid temperature setpoint; and
   b. the sensed supply fluid temperature and the predetermined full load return fluid temperature setpoint.

4. The control of claim 1 further comprising an outdoor ambient air temperature sensor to which the control means are responsive, wherein the control means are further operative to adjust said three full load fluid temperature setpoints by an offset that is a function of the outdoor ambient air temperature.

5. The control of claim 1 wherein the system temperature conditions a plurality of comfort zones further comprising a plurality of comfort zone temperature sensors to which the control means are responsive, and means for defining a desired temperature setpoint in the comfort zones, wherein the control means are further operative to adjust said three full load fluid temperature setpoints by an offset that is a function of the average deviation of the comfort zone temperatures from the setpoint.

6. The control of claim 5 wherein the control means are further operative to apply predetermined weighting factors to the deviation of the comfort temperature from the setpoint temperature in one or more selected comfort zones so that said average deviation is weighted relatively more by the deviation in some comfort zones than in others.

7. A control for a temperature conditioning system having a plurality of stages to chill a fluid circulated by the system to cool a comfort zone, said control comprising
   a. a supply fluid temperature sensor for sensing the temperature of the chilled fluid circulated to the comfort zone to cool it;
   b. a return fluid temperature sensor for sensing the temperature of the fluid after it has been used to cool the comfort zone;
   c. control means connected to the supply and the return temperature sensors, said control means being operative to selectively energize and de-energize stages of temperature conditioning in response to the relationship of both the return and the supply fluid temperatures to chiller capacity load curves, where the control means determines the chiller capacity load curves for supply and return water temperature as a function of
      i. a predetermined full load return fluid temperature setpoint;
      ii. a predetermined full load supply fluid temperature setpoint; and
      iii. a predetermined full load reference fluid temperature setpoint.

8. The control of claim 7 wherein the control means are further operative to adjust said three full load fluid temperature setpoints by an offset at start-up, said offset successively decreasing in value as the system approaches equilibrium.

9. The control of claim 8 wherein the offset at start-up is related to the greater of the differences between
   a. the sensed return fluid temperature and the predetermined full load return fluid temperature setpoint; and
   b. the sensed supply fluid temperature and the predetermined full load return fluid temperature setpoint.

10. The control of claim 7 further comprising an outdoor ambient air temperature sensor to which the control means are responsive, wherein the control means are further operative to adjust said three full load fluid temperature setpoints by an offset that is a function of the outdoor ambient air temperature.

11. The control of claim 7 wherein the system cools a plurality of comfort zones, further comprising a plurality of comfort zone temperature sensors to which the control means are responsive, and means for defining a desired temperature setpoint in the comfort zones, the control means being further operative to adjust said three full load fluid temperature setpoints by an offset that is a function of the average deviation of the comfort zone temperatures from the setpoints.

12. The control of claim 11 wherein the control means are further operative to apply predetermined weighting factors to the deviation of the comfort temperature from the setpoint temperature in one or more selected comfort zones so that said average deviation is weighted relatively more by the deviation in some comfort zones than in others.

13. A control for a fluid chiller system having a plurality of stages that may be selectively energized and de-energized to meet the cooling demand in a plurality of comfort zones, said control comprising
   a. a supply fluid temperature sensor for sensing the temperature of the chilled fluid supplied by the system to cool the comfort zone;
   b. a return fluid temperature sensor for sensing the temperature of the fluid after it is used to cool the comfort zone;
   c. control means connected to and responsive to the supply and the return fluid temperature sensors, said control means being operative to determine a desired return fluid temperature operating point as a function of a predetermined full load return fluid temperature setpoint and a predetermined full load reference temperature setpoint, and the relative loading of the chiller system; and operative to determine a supply fluid temperature operating point as a function of the predetermined full load reference temperature setpoint and a predetermined full load supply fluid temperature setpoint, and the relative loading of the chiller system; said control means controlling staging of the chiller system in response to the relative values of the desired return and supply fluid temperature operating points, and the sensed return and supply fluid temperatures, respectively.

14. The control of claim 13 wherein the control means are operative to energize an additional stage to increase the chiller system cooling capacity if:
   a. the sensed supply fluid temperature is greater than said supply fluid temperature operating point; and
   b. the sensed return fluid temperature is greater than said return fluid temperature operating point; and
   c. the sensed return fluid temperature has not decreased substantially since a previous change in staging.

15. The control of claim 14 wherein a stage is energized only after an interval of time, determined by the control means as a function of the relative loading of the chiller system, has elapsed since the last change in staging.

16. The control of claim 13 wherein the control means are operative to de-energize a stage to reduce the chiller system cooling capacity if:
   a. the sensed supply fluid temperature is less than said supply fluid temperature operating point; and
   b. the sensed return fluid temperature is less than said return fluid temperature operating point; and
   c. the sensed return water temperature has not increased substantially since a previous change in staging.

17. The control of claim 16 wherein a stage is de-energized only after an interval of time, determined by the control means as a function of the relative loading of the chiller system, has elapsed since the last change in staging.

18. The control of claim 13 wherein the control means are further operative to adjust said three full load fluid temperature setpoints by an offset value.

19. The control of claim 18 wherein the offset value is a function of one of the sensed return fluid and sensed supply fluid temperatures, and of the predetermined full load return fluid temperature setpoint, and is applied at start-up of the chiller system.

20. The control of claim 18 further comprising an outdoor ambient air temperature sensor to which the control means are responsive, said offset value being determined by the control means as a function of the outdoor ambient air temperature.

21. The control of claim 18 further comprising a plurality of comfort zone temperature sensors to which the control means are responsive, and means for defining a desired temperature setpoint in each comfort zone, wherein the offset is determined by the control means as a function of the average deviation of the comfort zone temperature from their respective setpoints.

22. The control of claim 21 wherein the control means are operative to apply predetermined weighting factors to the deviation of the comfort temperature from the setpoint in selected comfort zones so that said average deviation is weighted relatively more by the deviation in some comfort zones than in others.

23. In a variable capacity temperature conditioning system for chilling a fluid that is circulated to cool a comfort zone, a method for controlling the capacity of the system comprising the steps of:
   a. sensing the temperature of the fluid supplied by the system to cool the comfort zone;
   b. sensing the temperature of the fluid returning from the comfort zone after it is used to cool the zone; and
   c. varying the capacity of the temperature conditioning system in response to the deviation of the return and the supply fluid temperatures from desired values determined by the control means as a function of:
      i. a predetermined full load return fluid temperature setpoint;
      ii. a predetermined full load supply fluid temperature setpoint;
      iii. a predetermined full load reference fluid temperature setpoint; and
      iv. the relative loading of the temperature conditioning system.

24. The method of claim 23 further comprising the step of adjusting said three predetermined full load fluid temperature setpoints by an offset value at start-up of the system.

25. The method of claim 23 further comprising the steps of sensing outdoor ambient air temperature and adjusting said three predetermined full load fluid temperature setpoints by an offset value that is a function of the outdoor ambient air temperature.

26. The method of claim 23 wherein the temperature conditioning system cools a plurality of comfort zones, said method further comprising the steps of sensing the temperature in the comfort zones, and adjusting said three predetermined full load fluid temperature setpoints by an offset value that is a function of the average deviation of comfort zone temperatures from the desired temperature setpoint in the respective zones.

* * * * *